(12) United States Patent
Hiroe et al.

(10) Patent No.: US 11,753,961 B2
(45) Date of Patent: Sep. 12, 2023

(54) STARTUP CONTROL DEVICE, STARTUP CONTROL METHOD, AND PROGRAM

(71) Applicant: Mitsubishi Power, Ltd., Kanagawa (JP)

(72) Inventors: Takaharu Hiroe, Tokyo (JP); Kazunari Ide, Tokyo (JP); Ryo Sase, Tokyo (JP); Yoshito Nagahama, Yokohama (JP); Hiroshi Ito, Tokyo (JP); Yukihito Okuda, Tokyo (JP); Nobuhiro Osaki, Yokohama (JP); Shoichiro Hosomi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 25 days.

(21) Appl. No.: 17/626,610

(22) PCT Filed: Jul. 22, 2020

(86) PCT No.: PCT/JP2020/028563
§ 371 (c)(1),
(2) Date: Jan. 12, 2022

(87) PCT Pub. No.: WO2021/044761
PCT Pub. Date: Mar. 11, 2021

(65) Prior Publication Data
US 2022/0316363 A1     Oct. 6, 2022

(30) Foreign Application Priority Data

Sep. 3, 2019     (JP) .................................. 2019-160365

(51) Int. Cl.
*F01D 19/02*     (2006.01)
*F01D 19/00*     (2006.01)
*F01K 13/02*     (2006.01)

(52) U.S. Cl.
CPC ............. *F01D 19/02* (2013.01); *F01D 19/00* (2013.01); *F01K 13/02* (2013.01);
(Continued)

(58) Field of Classification Search
CPC .......... F01K 13/00; F01K 13/02; F01D 19/00; F01D 19/02
See application file for complete search history.

(56) References Cited

U.S. PATENT DOCUMENTS 4,228,359 A  * 10/1980  Matsumoto ............. F01D 19/02
                                                          290/40 R
2014/0260254 A1* 9/2014  Yoshida ................... F01D 19/02
                                                          60/664

(Continued)

FOREIGN PATENT DOCUMENTS

JP     8-339204     12/1996
JP     2004-76658    3/2004
(Continued)

OTHER PUBLICATIONS

International Search Report dated Oct. 6, 2020 in corresponding International Application No. PCT/JP2020/028563, with English-language translation.
Written Opinion dated Oct. 6, 2020 in corresponding International Application No. PCT/JP2020/028563, with English language translation.

*Primary Examiner* — Laert Dounis
(74) *Attorney, Agent, or Firm* — Wenderoth, Lind & Ponack, L.L.P.

(57) ABSTRACT

A startup control device for adjusting a startup schedule during startup of a power generation plant, the device includes: a determining unit which determines, on the basis of a predicted value of a physical quantity corresponding to the elapsed time from startup when the power generation plant has started up on the basis of a prescribed optimal startup schedule, and an observed value of the physical (Continued)

quantity acquired during the startup of the power generation plant, whether the observed value will exceed the predicted value. The device also includes a speed adjusting unit which, if the determining unit determines that the observed value will exceed the predicted value, issues an instruction to decelerate the speed of progress of elapsed time from the startup in the optimal startup schedule; and a startup timer which progresses the elapsed time from the startup at a speed based on the instruction.

8 Claims, 11 Drawing Sheets

(52) U.S. Cl.
 CPC ...... *F05D 2220/31* (2013.01); *F05D 2260/81* (2013.01); *F05D 2260/821* (2013.01)

(56) References Cited

U.S. PATENT DOCUMENTS

| | | | |
|---|---|---|---|
| 2014/0290249 A1* | 10/2014 | Yashiki | F01D 19/02 60/657 |
| 2014/0290250 A1* | 10/2014 | Yoshida | F01D 17/02 60/657 |
| 2015/0121874 A1* | 5/2015 | Yoshida | F01K 13/02 60/660 |
| 2016/0247074 A1* | 8/2016 | Takeuchi | F01K 5/00 |
| 2017/0002692 A1* | 1/2017 | Cheng | F01K 13/02 |

FOREIGN PATENT DOCUMENTS

| | | |
|---|---|---|
| JP | 3666035 | 6/2005 |
| JP | 2016-156306 | 9/2016 |

* cited by examiner

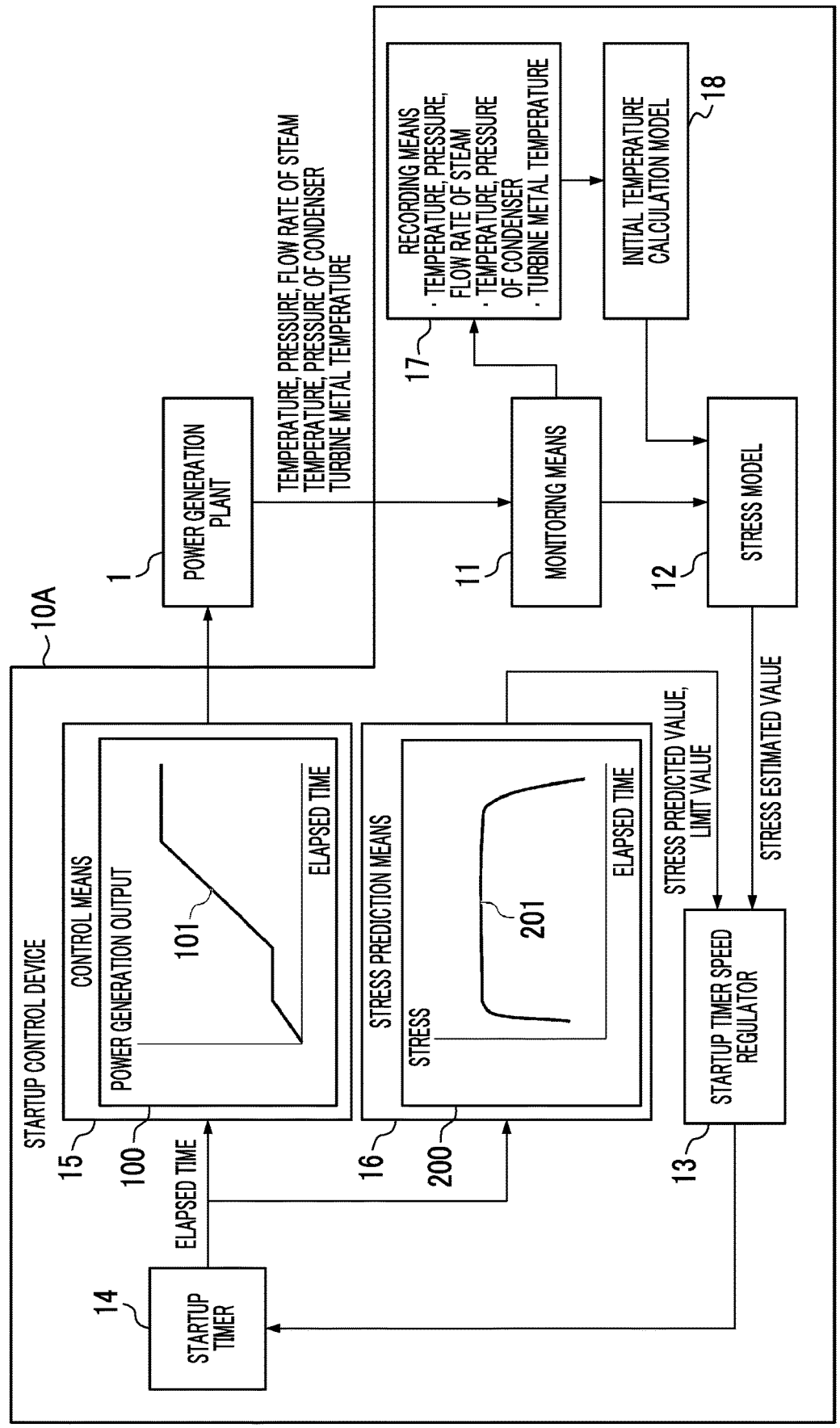

STARTUP CONTROL DEVICE, STARTUP CONTROL METHOD, AND PROGRAM

TECHNICAL FIELD

The present disclosure relates to a startup control device, a startup control method, and a program.

The present application claims priority based on Japanese Patent Application No. 2019-160365 filed in Japan on Sep. 3, 2019, the contents of which are incorporated herein by reference.

BACKGROUND ART

In recent years, the introduction of renewable energy such as wind power generation and solar power generation has progressed, and the ratio of renewable energy in the entire power system is increasing. Since the amount of power generated by wind power generation and solar power generation fluctuates depending on the weather, it is difficult to provide a stable power supply. Power generation plants of thermal power or the like need to compensate for fluctuations in the output of renewable energy. Therefore, the value of starting a power generation plant in the shortest time is required.

Shortening the startup time of a power generation plant is essentially achieved by a sharp increase in fuel input to the power generation plant. However, for example, equipment such as boilers and turbines that configure a power generation plant have thermal stress constraints, and the operation is performed such that the amount of fuel input is gradually increased under these constraints. The power generation plant has an automatic control system, and if the desired amount of power generation is designated for the power generation plant, a flow rate of fuel input, a temperature and pressure of steam, and a flow rate of steam for turning the turbine such that the amount of power generation can be obtained are automatically controlled. Therefore, the startup of the power generation plant is also executed by using the existing automatic control system and designating a schedule for increasing the amount of power generation in the automatic control system.

For example, in a power generation plant equipped with a steam turbine, the biggest constraint when trying to shorten the startup time is the thermal stress of the steam turbine. The steam turbine has an impeller inside, and converts thermal energy of high-temperature and high-pressure steam into power to turn a generator with the impeller. Before starting the impeller, for example, when it is at room temperature, and high-temperature steam comes into contact with the impeller, a temperature difference occurs between the surface and the inside of the impeller, and thermal stress is generated in the impeller because of the difference in thermal elongation due to the temperature difference. The thermal stress of the impeller can be reduced within constraints by gradually increasing the flow rate of steam flowing into the steam turbine. While maintaining the thermal stress of the impeller within the constraints, a target output is achieved as soon as possible to achieve the startup in the shortest time.

Thermal stress is important to achieve the startup in the shortest time in this way, but thermal stress cannot be measured directly. Therefore, a numerical model is used in advance to calculate predicted values of the temperature and pressure of steam, and thermal stress for a large number of startup curve candidates, and an optimal startup curve is determined by numerical search.

FIG. 10 shows an example of a method of determining a startup schedule in the related art. A graph 100 in FIG. 10 shows the startup schedule of the power generation plant. The horizontal axis of the graph 100 is the elapsed time from the startup, and the vertical axis is the amount of power generation. In the startup schedule, the target amount of power generation is set according to the elapsed time from the startup. Hereinafter, the rising curve of the amount of power generation is referred to as a startup curve. An optimal startup curve 101 is a startup curve when the power generation plant is started at the fastest speed after satisfying constraints such as thermal stress. A relaxation startup curve 102 is a startup curve when the startup speed is relaxed and the startup is performed.

A graph 200 in FIG. 10 shows a transition of the thermal stress of the impeller during the startup of the power generation plant. Hereinafter, the transition of thermal stress is referred to as a stress predicted value curve. The horizontal axis of the graph 200 is the elapsed time, and the vertical axis is the predicted value of stress. The same position on the horizontal axis of the graph 100 and the graph 200 indicates the same time. An optimal stress predicted value curve 201 shows a predicted value of thermal stress generated when the power generation plant is started based on the optimal startup curve 101, and a stress predicted value curve 202 shows a thermal stress generated when the power generation plant is started based on the relaxation startup curve 102. The optimal stress predicted value curve 201 and the stress predicted value curve 202 are obtained by inputting the temperature, flow rate, or the like of steam at the steam turbine inlet when the power generation plant is started based on the optimal startup curve 101 and the relaxation startup curve 102, respectively, to a predetermined stress prediction model. The steam temperature, flow rate, or the like at the steam turbine inlet are values calculated by a simulator that simulates the operation of a power generation plant based on a numerical model.

As shown in FIG. 10, the optimal stress predicted value curve 201 rises to the vicinity of a limit line 203 indicating a stress limit value. There is an error in the numerical model used by the simulator for calculation, and the temperature and pressure of the steam during startup are different from the prediction. If the steam temperature is higher than expected, the thermal stress is considered to be higher than previously predicted. For example, when started based on the optimal startup curve 101, the actual stress may exceed the limit line 203. In order to avoid such a situation, in the related art, in consideration of the error between the simulation result and the actual operation, the startup curve is gently set (for example, relaxation startup curve 102) such that the stress error does not exceed the limit line 203 even if the error occurs. However, if the startup curve is gentle, even if the thermal stress can be reduced within the constraint, the startup time becomes long and the startup in the shortest time cannot be achieved.

PTL 1 discloses a method of calculating a basic schedule which is determined according to a temperature state at the time of startup, by a correction based on a margin value of an operation restriction factor (for example, the stress of the steam turbine) in the startup process of the plant, in the startup schedule of a thermal power generation plant having a boiler that generates steam and a steam turbine driven by the steam generated by the boiler. More specifically, it is disclosed that the startup schedule is calculated by $(1-\lambda) X_1 + \lambda X_2$, by using a first startup schedule $X_1$ in which the basic schedule is corrected by fuzzy inference and a second startup schedule $X_2$ in which the basic schedule is corrected by a correction amount output by a neural network constructed to output the correction amount according to the operating conditions of the plant, and an adoption ratio A of the second startup schedule $X_2$ is increased as the startup is repeated. According to the method of PTL 1, it is possible to automatically create a startup schedule that minimizes the startup time while satisfying the operation restriction condition.

CITATION LIST

Patent Literature

[PTL 1] Japanese Unexamined Patent Application Publication No. 08-339204

SUMMARY OF INVENTION

Technical Problem

The method disclosed in PTL 1 corrects and optimizes the startup schedule, based on the error between the prediction and the actual value reality each time the startup is repeated, but the correction is reflected at the next startup. Therefore, it is necessary to consider the discrepancy between the predicted value of thermal stress and the actual thermal stress due to external influences such as the outside air temperature and seawater temperature during actual startup, and the influence of changes in the plant itself such as dirt on a heat transfer surface of the boiler. Therefore, for example, gentle startup such as the relaxation startup curve 102 illustrated in FIG. 10 is selected, and in the end, the startup in the shortest time may not be achieved.

The present disclosure provides a startup control device, a startup control method, and a program capable of solving the above problems.

Solution to Problem

A startup control device of the present disclosure includes: a determination unit that, for a predetermined physical quantity that constrains startup of a power generation plant, determines, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value; a speed adjustment unit that, when the determination unit determines that the observed value exceeds the predicted value, issues an instruction to decrease a progress speed of the elapsed time from the startup in the optimal startup schedule; and a startup timer that advances the elapsed time from the startup at a speed based on the instruction.

A startup control method of the present disclosure includes: determining, for a predetermined physical quantity that constrains startup of a power generation plant, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value; issuing, when it is determined that the observed value exceeds the predicted value, an instruction to decrease a progress speed of the elapsed time from the startup in the optimal startup schedule; and advancing the elapsed time from the startup at a speed based on the instruction.

A program of the present disclosure causes a computer to function as: a determination unit that, for a predetermined physical quantity that constrains startup of a power generation plant, determines, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value; means for issuing, when it is determined that the observed value exceeds the predicted value, an instruction to decrease a progress speed of the elapsed time from the startup in the optimal startup schedule; and means for advancing the elapsed time from the startup at a speed based on the instruction.

Advantageous Effects of Invention

According to the above-described startup control device, startup control method, and program, the startup schedule of a power generation plant can be adjusted during startup.

BRIEF DESCRIPTION OF DRAWINGS

FIG. 4 is a diagram showing a configuration example of a startup control device for a power generation plant according to a second embodiment.

DESCRIPTION OF EMBODIMENTS

Hereinafter, the control system of the power generation plant according to each embodiment will be described in detail with reference to FIGS. 1 to 11.

First Embodiment (Configuration)

Figure 1:
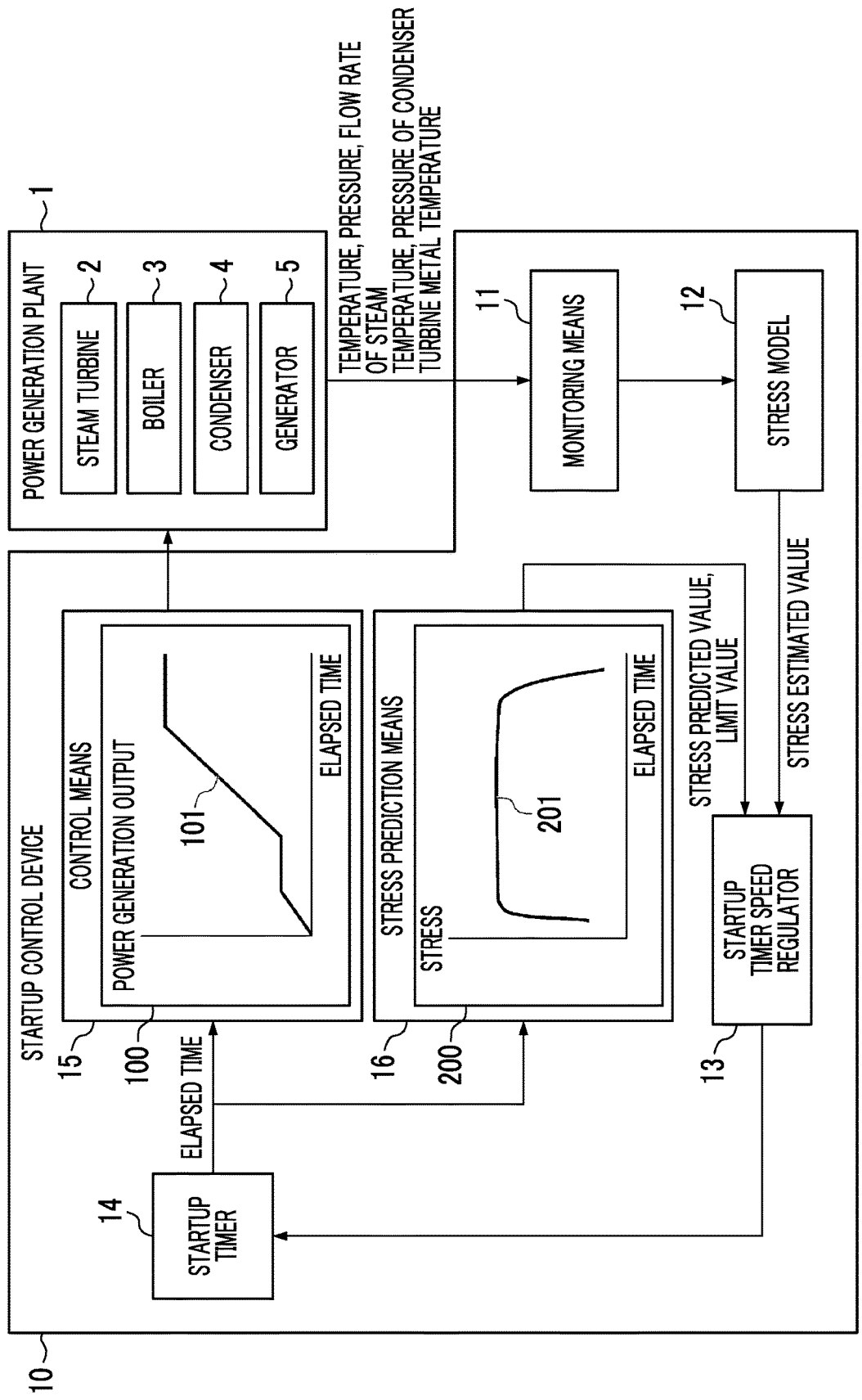
FIG. 1 is a diagram showing a configuration example of a startup control device for a power generation plant according to a first embodiment.

FIG. 1 is a diagram showing a configuration example of a startup control device for a power generation plant according to the first embodiment.

FIG. 1 shows a power generation plant 1 and a startup control device 10 that controls startup of the power generation plant 1. The power generation plant 1 includes, for example, a boiler 3, a steam turbine 2 driven by steam from the boiler 3, a generator 5 driven by the steam turbine 2 to generate power, and a condenser 4 that converts steam exhausted from the steam turbine 2 back to water and supplies the water to the boiler 3. The startup control device 10 includes monitoring means 11, a stress model 12, a startup timer speed regulator 13, a startup timer 14, control means 15, and stress prediction means 16.

The monitoring means 11 acquires operation data measured by a sensor provided in the power generation plant 1. For example, the monitoring means 11 acquires measured values of a temperature, pressure, and flow rate of steam flowing into the steam turbine 2, measured values of a water temperature and pressure of the condenser 4, a measured value of a turbine metal temperature of the steam turbine 2, or the like.

The stress model 12 is a numerical model that outputs an estimated value of thermal stress generated in an impeller of the steam turbine 2 when the operation data acquired by the monitoring means 11 is input.

The startup timer speed regulator 13 controls a progress speed of the startup timer 14 (the progress of the elapsed time measured by the startup timer 14).

The startup timer 14 advances the elapsed time in the startup schedule after the power generation plant 1 is started, at a speed based on a speed command of the startup timer speed regulator 13. In the initial setting, the startup timer 14 measures the time at the same speed as the real time, for example.

The control means 15 controls the operation of the power generation plant 1 at the time of startup. The control means 15 has a graph 100 in which the optimal startup curve 101 is defined. The control means 15 determines the power generation output indicated by the optimal startup curve 101 in the elapsed time measured by the startup timer 14 as the target output at that time, and calculates a control signal for achieving the target output (for example, a valve opening command value, a command value of the fuel input amount, or the like). The control means 15 calculates the control signal according to the elapsed time measured by the startup timer 14 and the target output based on the optimal startup curve 101 every moment, and controls the startup of the power generation plant 1, by outputting the control signal to the power generation plant 1. When the fastest startup is achieved, the startup timer 14 measures the time at the same speed as the real time, and the control means 15 calculates a control signal corresponding to the target output at each time indicated by the optimal startup curve 101 at the elapsed speed of the same time, and outputs the control signal to the power generation plant 1.

The stress prediction means 16 outputs a predicted value of the thermal stress generated in the impeller of the steam turbine 2 in the elapsed time measured by the startup timer 14. The stress prediction means 16 has a graph 200 in which predicted values of thermal stress are defined. The optimal stress predicted value curve 201 shows the thermal stress generated in the impeller of the steam turbine 2, when the power generation plant 1 performs the fastest startup shown in the optimal startup curve 101. The optimal stress predicted value curve 201 is created by a simulation based on the optimal startup curve 101. The stress prediction means 16 outputs a stress value indicated by the optimal stress predicted value curve 201 in the elapsed time measured by the startup timer 14 as a predicted value of thermal stress. The stress prediction means 16 may output a limit value of thermal stress (limit line 203).

(Operation)

Next, the operation of the startup control device 10 will be described with reference to FIGS. 2, 3A, and 3B.

Figure 2:
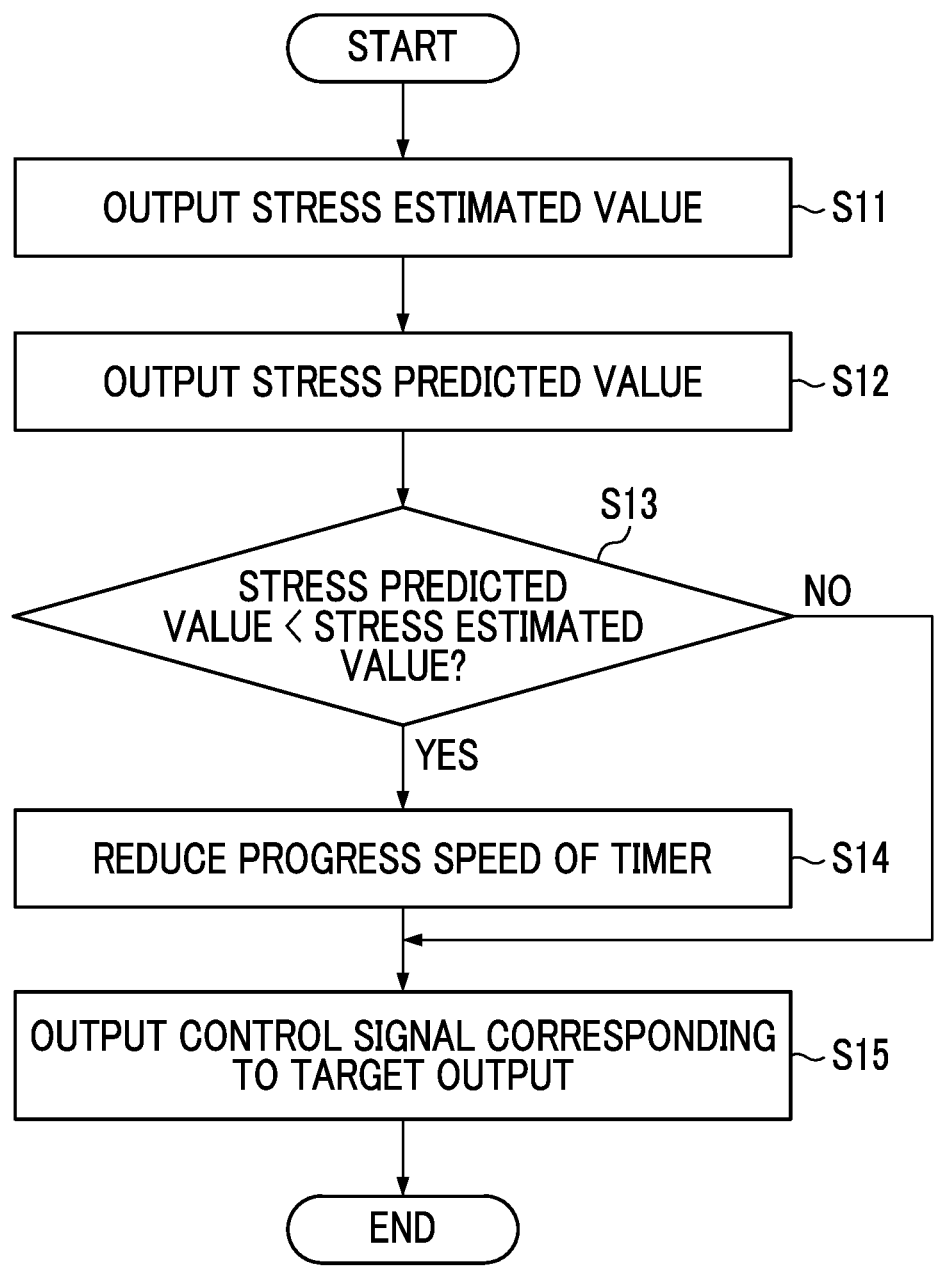
FIG. 2 is a diagram showing an example of processing of the startup control device according to the first embodiment.
Figure 3A:
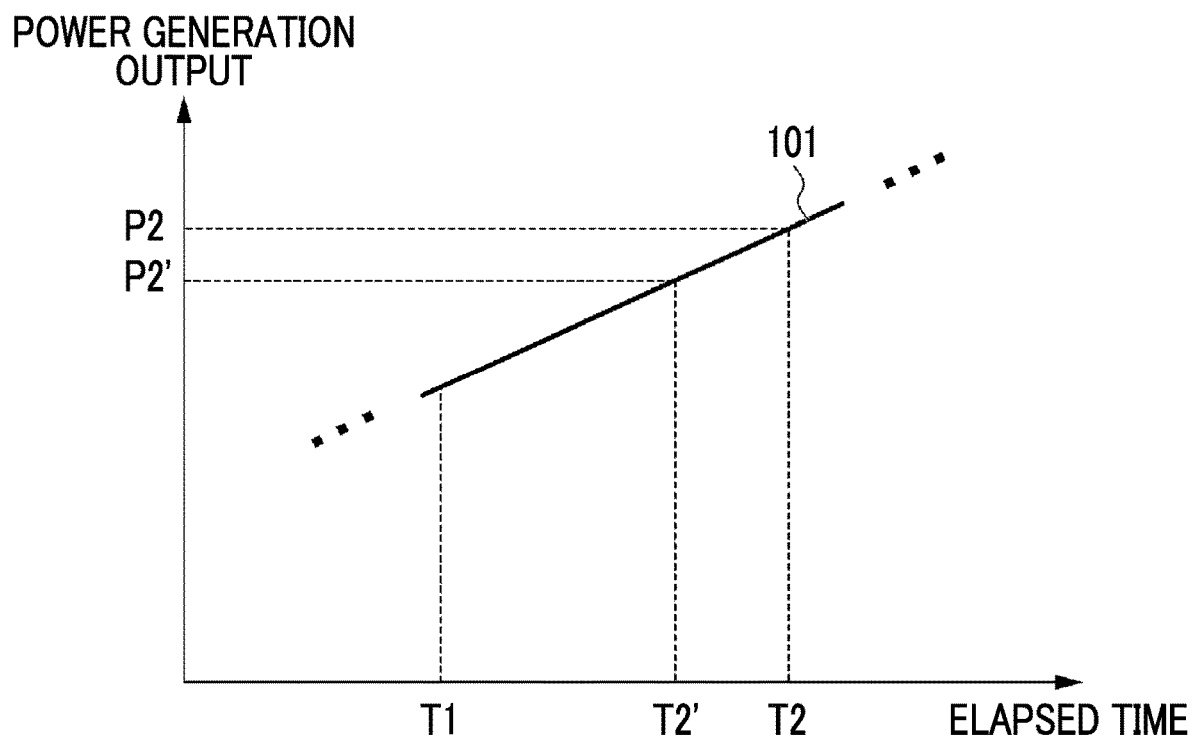
FIG. 3A is a first diagram illustrating a startup control method according to the first embodiment.
Figure 3B:
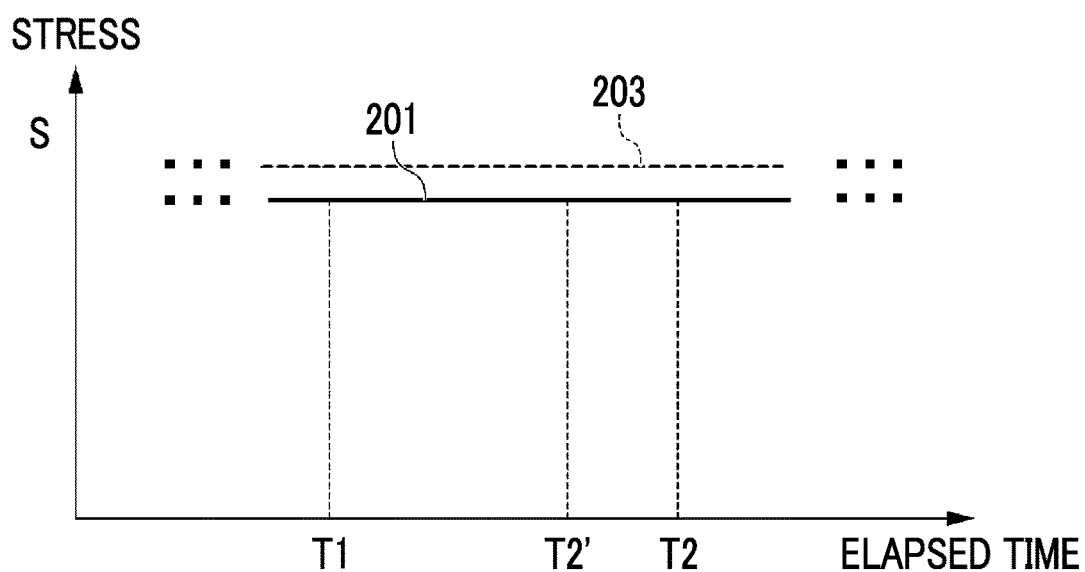
FIG. 3B is a second diagram illustrating the startup control method according to the first embodiment.

FIG. 2 is a diagram showing an example of processing of the startup control device according to the first embodiment. FIG. 3A is a first diagram illustrating a startup control method according to the first embodiment. FIG. 3B is a second diagram illustrating the startup control method according to the first embodiment.

The startup control device 10 repeats the following processes in a predetermined control cycle, from the start of the startup of the power generation plant 1 to the completion of the startup. Meanwhile, the monitoring means 11 acquires the latest measured value of the operation data from the power generation plant 1 at predetermined time intervals. The startup timer 14 ticks at a speed instructed by the startup timer speed regulator 13.

The monitoring means 11 acquires the temperature, pressure, and flow rate of the steam, the water temperature and pressure of the condenser 4, the turbine metal temperature, or the like at the inlet of the steam turbine 2 from the power generation plant 1. The monitoring means 11 inputs these values into the stress model 12. The stress model 12 estimates the thermal stress generated in the impeller of the steam turbine 2 based on the input parameters, and outputs the stress estimated value to the startup timer speed regulator 13 (step S11).

On the other hand, the stress prediction means 16 acquires the elapsed time from the startup measured by the startup timer 14, and calculates the stress indicated by the optimal stress predicted value curve 201 in the elapsed time. The stress prediction means 16 outputs the stress calculated based on the optimal stress predicted value curve 201 to the startup timer speed regulator 13 as a stress predicted value (step S12). The processes of steps S11 and S12 are performed in parallel, and there is no preference in the order of processes.

Next, the startup timer speed regulator 13 compares the acquired stress predicted value with the stress estimated value (step S13). When the stress predicted value is equal to or higher than the stress estimated value (step S13; No), the estimated value of thermal stress based on the measured value acquired from the power generation plant 1 is currently less than the thermal stress generated at the shortest startup, and the actual thermal stress is considered to be within a permissible range. Therefore, it is not necessary to slow down the startup speed of the power generation plant 1, and the startup timer 14 may advance the elapsed time at the current speed. The startup timer speed regulator 13 instructs the startup timer 14 to advance the elapsed time at the same speed as the present (or does not specifically instruct). For example, the startup timer speed regulator 13 outputs a command of 1.0 times speed to the startup timer 14. The startup timer 14 measures (advances) the elapsed time from the startup at the current speed, and outputs the elapsed time at that time to the control means 15 and the stress prediction means 16. The control means 15 determines a target output based on the optimal startup curve 101 and the elapsed time acquired from the startup timer 14, and calculates a control signal according to the target output. The control means 15 outputs a control signal to the power generation plant 1 (step S15).

When the stress estimated value exceeds the stress predicted value (step S13; Yes), the currently generated thermal stress exceeds the thermal stress generated at the shortest startup, so that the thermal stress may exceed the allowable thermal stress constraint. Therefore, it is necessary to slow down the startup speed of the power generation plant 1 to reduce thermal stress. The startup timer speed regulator 13 instructs the startup timer 14 to reduce the progress speed for advancing the elapsed time (step S14). For example, the rate at which the progress speed of the elapsed time on the startup schedule is reduced depends on the degree to which the stress estimated value exceeds the stress predicted value, and the startup timer speed regulator 13 issues a speed command according to this setting. For example, the startup timer speed regulator 13 instructs the startup timer 14 to advance the elapsed time at a 0.8 times speed. Then, the startup timer 14 reduces the ticking speed of the elapsed time by 0.8 times the speed so far. The startup timer 14 outputs the elapsed time at that time, which is ticking at a speed 0.8 times the speed so far, to the control means 15 and the stress prediction means 16.

The control means 15 determines a target output based on the optimal startup curve 101 and the elapsed time acquired from the startup timer 14, and calculates a control signal according to the target output. Here, reference is made to FIGS. 3A and 3B. FIG. 3A illustrates the optimal startup curve 101, and FIG. 3B illustrates the main parts of the optimal stress predicted value curve 201. An elapsed time T1 is the elapsed time measured by the startup timer 14 in the immediately previous control cycle. An elapsed time T2 is the elapsed time measured by the startup timer 14 in the current control cycle when the time progress speed is 1.0 times speed (same as the current speed). An elapsed time T2' is the elapsed time measured by the startup timer 14 in the current control cycle when the time progress speed is reduced. When the stress estimated value is equal to or less than a stress predicted value S (step S13; No), the control means 15 sets a target output as P2 and calculates the control signal. On the other hand, when the stress estimated value exceeds the stress predicted value S (step S13; Yes), the control means 15 sets a target output as P2' and calculates the control signal.

In the next control cycle, the startup control device 10 also performs the processes of steps S11 to S15. In step S13, the stress predicted value S according to the elapsed time measured by the startup timer 14 is compared with the stress estimated value estimated based on the latest measured value. When the stress estimated value output by the stress model 12 becomes equal to or less than the stress predicted value S by reducing the progress speed of the startup timer 14 and lowering the target output, the progress speed of the startup timer 14 is maintained as it is. Thus, the power generation plant 1 is started with its output increasing more slowly than the startup indicated by the optimal startup curve 101, while satisfying the constraint of thermal stress. Even in this case, there is a possibility that the startup can be performed in a shorter time than the startup based on the relaxation startup curve 102 from the beginning. If there is no positive determination in step S13, the power generation plant 1 can be started in the shortest time. As described above, according to the startup control method of the present embodiment, the power generation plant 1 can be started as quickly as possible according to the actual thermal stress (estimated value).

The stress estimated value and the stress predicted value are compared in step S13, but the stress prediction means 16 may output a stress limit value indicated by the limit line 203 to the startup timer speed regulator 13, and the startup timer speed regulator 13 may compare the stress estimated value with the stress limit value. In this case, if the stress estimated value exceeds the stress limit value, the startup timer speed regulator 13 instructs the startup timer 14 to reduce the progress speed of the timer.

The startup control device 10 of the present embodiment includes (1) a stress model 12 that receives the latest measured values such as temperature, pressure, and flow rate of steam flowing into the steam turbine 2 from the power generation plant 1 every moment, and estimates the estimated value of the stress generated in the impeller of the steam turbine 2 at that time, (2) a startup timer speed regulator 13 that receives the stress estimated value output by the stress model 12 and the predicted value of the stress generated when the power generation plant is started with the optimal startup curve 101, or a stress limit value, compares the stress estimated value and the stress predicted value, or compares the stress estimated value and the stress limit value, and, for example, if the stress estimated value exceeds the stress predicted value, issues a speed command to the startup timer 14 such that the startup timer 14 reduces the speed at which the elapsed time is measured, and (3) a startup timer 14 that advances the elapsed time on the startup schedule according to the speed command. These configurations have the effect of adjusting the startup curve in real time during startup. By adjusting the startup curve in real time, it is possible to arbitrate the discrepancy between the response of the plant predicted by the numerical model and the actual plant response. In particular, when the steam temperature measured in the power generation plant 1 becomes higher than the predicted value, the stress of the impeller may exceed the limit value, but in such a case, the effect of relaxing the startup curve and preventing the excess of stress can be obtained.

In the flowchart of FIG. 2, when the stress estimated value exceeds the stress predicted value or the stress limit value, the startup timer speed regulator 13 instructs the startup timer 14 to reduce the progress speed of the timer, but on the contrary, when the stress estimated value is lower than the stress predicted value or the stress limit value, the startup timer speed regulator 13 may instruct the startup timer 14 to increase the progress speed of the timer, according to the magnitude of the deviation. Accordingly, while satisfying the requirement of thermal stress limitation, the startup speed can be prevented from decreasing and can approach the startup speed indicated by the optimal startup curve 101.

Second Embodiment (Configuration)

Hereinafter, a startup control device 10A according to the second embodiment of the present disclosure will be described with reference to FIG. 4.

FIG. 4 is a diagram showing a configuration example of a startup control device for a power generation plant according to the second embodiment.

Among the components according to the second embodiment of the present disclosure, the same components as the functional units configuring the startup control device 10 according to the first embodiment of the present disclosure are designated by the same reference numerals, and the description thereof will be omitted. The startup control device 10A according to the second embodiment includes recording means 17 and an initial temperature calculation model 18 in addition to the components of the first embodiment.

The recording means 17 records the history of operation data from before the startup of the power generation plant 1, in a storage unit (not shown). For example, the recording means 17 records in the storage unit, the measured values of the temperature, pressure, and flow rate of the steam, the measured values of the water temperature and pressure of the condenser 4, the measured value of the turbine metal temperature, or the like at the inlet of the steam turbine 2 acquired by the monitoring means 11 at predetermined time intervals from before the startup of the power generation plant 1 to the starting of the startup together with the time when the measured values are acquired.

The initial temperature calculation model 18 is a numerical model that reads various parameters recorded by the recording means 17 and calculates an initial temperature of the impeller of the steam turbine 2 at the time of startup of the power generation plant 1.

For example, the initial temperature of the impeller of the steam turbine 2 differs between a hot day and a cold day. If the initial temperature is different, the thermal stress generated in the impeller after startup will also vary. In the second embodiment, the initial temperature of the impeller is appropriately set based on the operation data before starting, and the calculation accuracy of the thermal stress by the stress model 12 is improved.

(Operation)

When starting the startup of the power generation plant 1, the initial temperature calculation model 18 calculates the initial temperature of the impeller. The initial temperature calculation model 18 outputs the initial temperature of the impeller to the stress model 12. The stress model 12 uses the initial temperature of the impeller to estimate the thermal stress of the impeller after starting the startup. Other processes after starting the startup are the same as those described with reference to FIG. 2.

The startup control device 10A according to the present embodiment includes the recording means 17 and the initial temperature calculation model 18. These configurations act to accurately determine the initial temperature of the impeller in the stress calculation by the stress model 12. This improves the accuracy of stress calculation and has the effect of reducing the risk of damage due to excessive stress.

Third Embodiment (Configuration)

Hereinafter, a startup control device 10B according to a third embodiment of the present disclosure will be described with reference to FIGS. 5 to 6.

Figure 5:
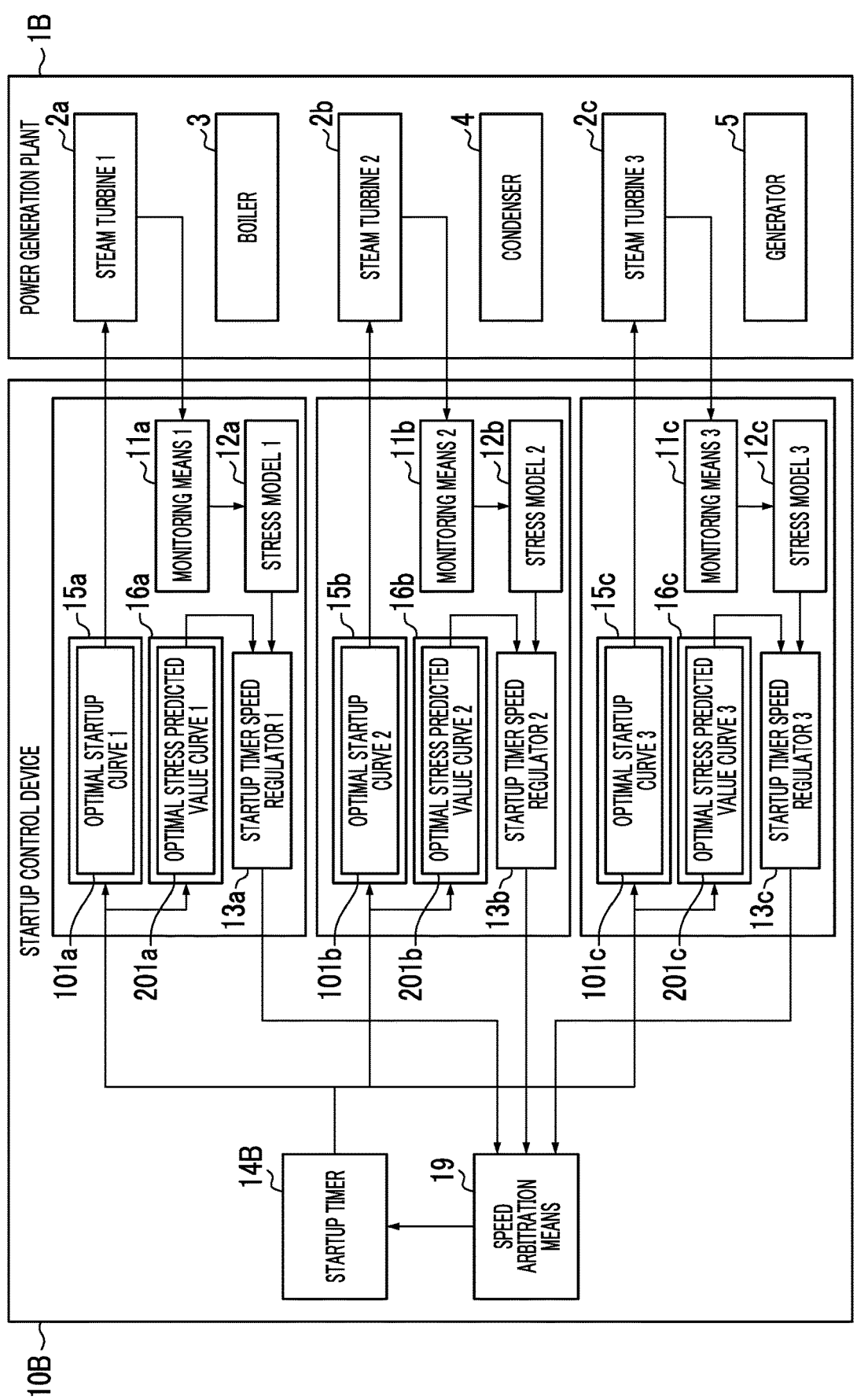
FIG. 5 is a diagram showing a configuration example of a startup control device for a power generation plant according to a third embodiment.

FIG. 5 is a diagram showing a configuration example of a startup control device for a power generation plant according to the third embodiment.

As shown in FIG. 5, a power generation plant 1B includes steam turbines 2a (high pressure), 2b (medium pressure), and 2c (low pressure). The startup control device 10B includes monitoring means 11a to 11c, stress models 12a to 12c, startup timer speed regulators 13a to 13c, a startup timer 14B, control means 15a to 15c, stress prediction means 16a to 16c, and speed arbitration means 19.

The control means 15a has an optimal startup curve 101a for the steam turbine 2a. The control means 15b has an optimal startup curve 101b for the steam turbine 2b. The control means 15c has an optimal startup curve 101c for the steam turbine 2c.

The optimal startup curve 101a for the steam turbine 2a is a startup curve in which a target value of the power generation output according to the elapsed time from the startup when the steam turbine 2a is started at the fastest speed is set, while satisfying the constraint of thermal stress. The same applies to the optimal startup curves 101b and 101c.

The stress prediction means 16a has an optimal stress predicted value curve 201a showing a predicted value of thermal stress generated in the impeller of the steam turbine 2a when the steam turbine 2a is started based on the optimal startup curve 101a. Similarly, the stress prediction means 16b has an optimal stress predicted value curve 201b corresponding to the optimal startup curve 101b. Similarly, the stress prediction means 16c has an optimal stress predicted value curve 201c corresponding to the optimal startup curve 101c. The optimal stress predicted value curve 201a is a transition of the predicted value of the thermal stress generated in the impeller of the steam turbine 2a calculated when the startup of the optimal startup curve 101a is simulated by using a simulator that simulates the operation of the power generation plant 1. The same applies to the optimal stress predicted value curves 201b and 201c.

The startup control device 10B includes, for example, monitoring means 11a for acquiring operation data of the steam turbine 2a corresponding to the steam turbine 2a, a stress model 12a for estimating the thermal stress of the impeller of the steam turbine 2a, a startup timer speed regulator 13a, control means 15a for controlling the startup of the steam turbine 2a, and stress prediction means 16a. The same applies to the steam turbines 2b and 2c. The functions of the monitoring means 11a to 11c, the stress models 12a to 12c, the startup timer speed regulators 13a to 13c, the control means 15a to 15c, and the stress prediction means 16a to 16c are the same as those of the first embodiment.

The speed arbitration means 19 acquires a speed command from each of the startup timer speed regulators 13a to 13c and selects the slowest speed command. For example, when commands of 1.0 times speed, 0.9 times speed, and 0.8 times speed are acquired from the startup timer speed regulator 13a, the startup timer speed regulator 13b, and the startup timer speed regulator 13c, respectively, the speed arbitration means 19 selects the 0.8 times speed.

The startup timer 14B acquires the speed command selected by the speed arbitration means 19, and adjusts the progress speed of the elapsed time after the startup of the power generation plant 1. The startup timer 14B outputs the measured elapsed time to the control means 15a to 15c and the stress prediction means 16a to 16c.

Only the stress estimated value of the impeller of the steam turbine 2a among the steam turbines 2a to 2c exceeds the stress predicted value in the startup of the power generation plant 1, only the steam turbine 2a is started with a gentle startup curve, and the steam turbines 2b and 2c cannot be started based on the optimal startup curves 101b and 101c. In such a case, all the startup curves of the steam turbines 2a to 2c are aligned with gentle curves and are started over the same amount of time.

(Operation)

Figure 6:
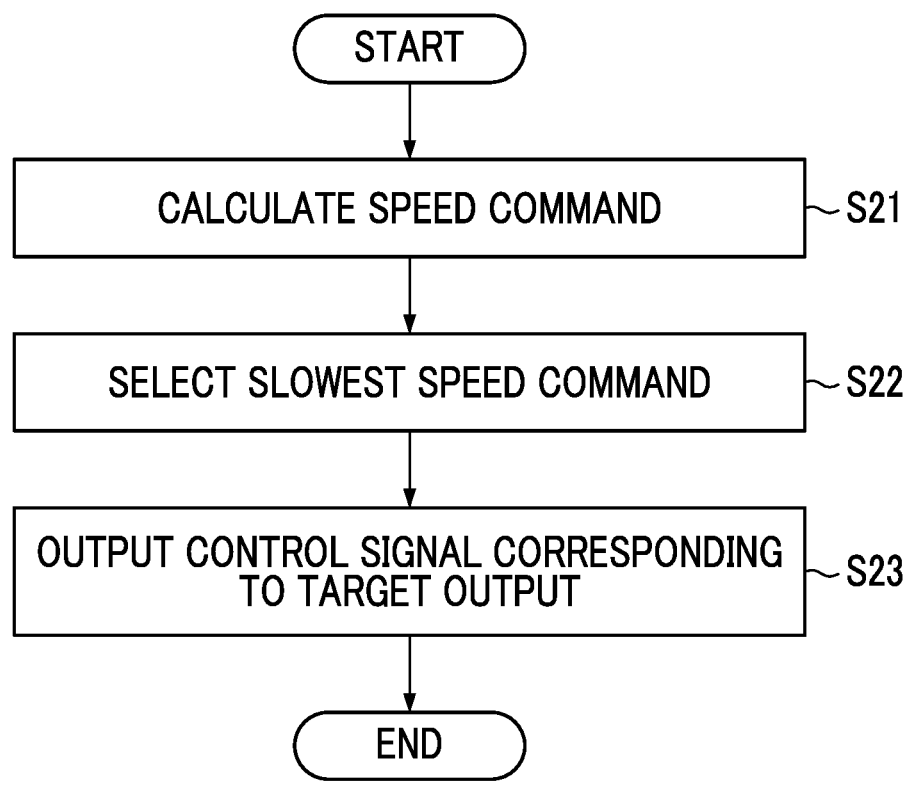
FIG. 6 is a diagram showing an example of processing of the startup control device according to the third embodiment.

FIG. 6 is a diagram showing an example of processing of the startup control device according to the third embodiment.

The startup control device 10B performs the following processes in a predetermined control cycle.

First, the startup control device 10B calculates a speed command for each of the steam turbines 2a to 2c (step S21).

Specifically, for example, for the steam turbine 2a, the startup control device 10B uses the monitoring means 11a, the stress model 12a, the startup timer speed regulator 13a, and the stress prediction means 16a to perform processes in steps S11 to S13 of FIG. 2. The startup timer speed regulator 13a sets the speed command according to the result of the comparison in step S13, and outputs the speed command to the speed arbitration means 19. The same applies to the steam turbines 2b and 2c. The startup timer speed regulator 13b outputs a speed command according to the state of thermal stress of the impeller of the steam turbine 2b to the speed arbitration means 19. The startup timer speed regulator 13c outputs a speed command according to the state of thermal stress of the impeller of the steam turbine 2c to the speed arbitration means 19.

Next, the speed arbitration means 19 selects the slowest speed command, among the speed commands acquired respectively from the startup timer speed regulators 13a to 13c (step S22). For example, when the commands of 1.0 times speed, 0.9 times speed, and 0.8 times speed are acquired, the speed arbitration means 19 selects 0.8 times speed. The speed arbitration means 19 outputs the selected value to the startup timer 14B. The startup timer 14B advances the elapsed time at a speed based on the speed command issued by the speed arbitration means 19. The startup timer 14B outputs the measured elapsed time to the control means 15a to 15c and the stress prediction means 16a to 16c.

The control means 15a sets a target output based on the optimal startup curve 101a and the elapsed time acquired from the startup timer 14B as described in step S15 of FIG. 2, and outputs a control signal corresponding to the target output to the steam turbine 2a (step S23). Similarly, the control means 15b sets a target output based on the optimal startup curve 101b and the elapsed time acquired from the startup timer 14B, and outputs a control signal corresponding to the target output to the steam turbine 2b. The control means 15c sets a target output based on the optimal startup curve 101c and the elapsed time acquired from the startup timer 14B, and outputs a control signal corresponding to the target output to the steam turbine 2c.

The startup control device 10B according to the present embodiment includes (1) a plurality of optimal startup curves 101a to 101c and optimal stress predicted value curves 201a to 201c, (2) a plurality of startup timer speed regulators 13a to 13c, and (3) speed arbitration means 19 that arbitrates the speed commands output by the plurality of startup timer speed regulators 13a to 13c and that outputs the final speed command. Thus, the same effect as in the first embodiment can be obtained for the power generation plant 1 having a plurality of steam turbines 2a to 2c, corresponding to a plurality of steam turbines 2a to 2c provided in the power generation plant 1.

The third embodiment can also be combined with the second embodiment.

Fourth Embodiment

Hereinafter, a startup control device according to a fourth embodiment of the present disclosure will be described with reference to FIGS. 7 to 8.

In the first to third embodiments, the startup speed of the power generation plant 1 is controlled based on the thermal stress of the impeller. On the other hand, in the fourth embodiment, the startup speed is controlled based on the steam temperature at the inlet of the steam turbine 2.

(Configuration)

Figure 7:
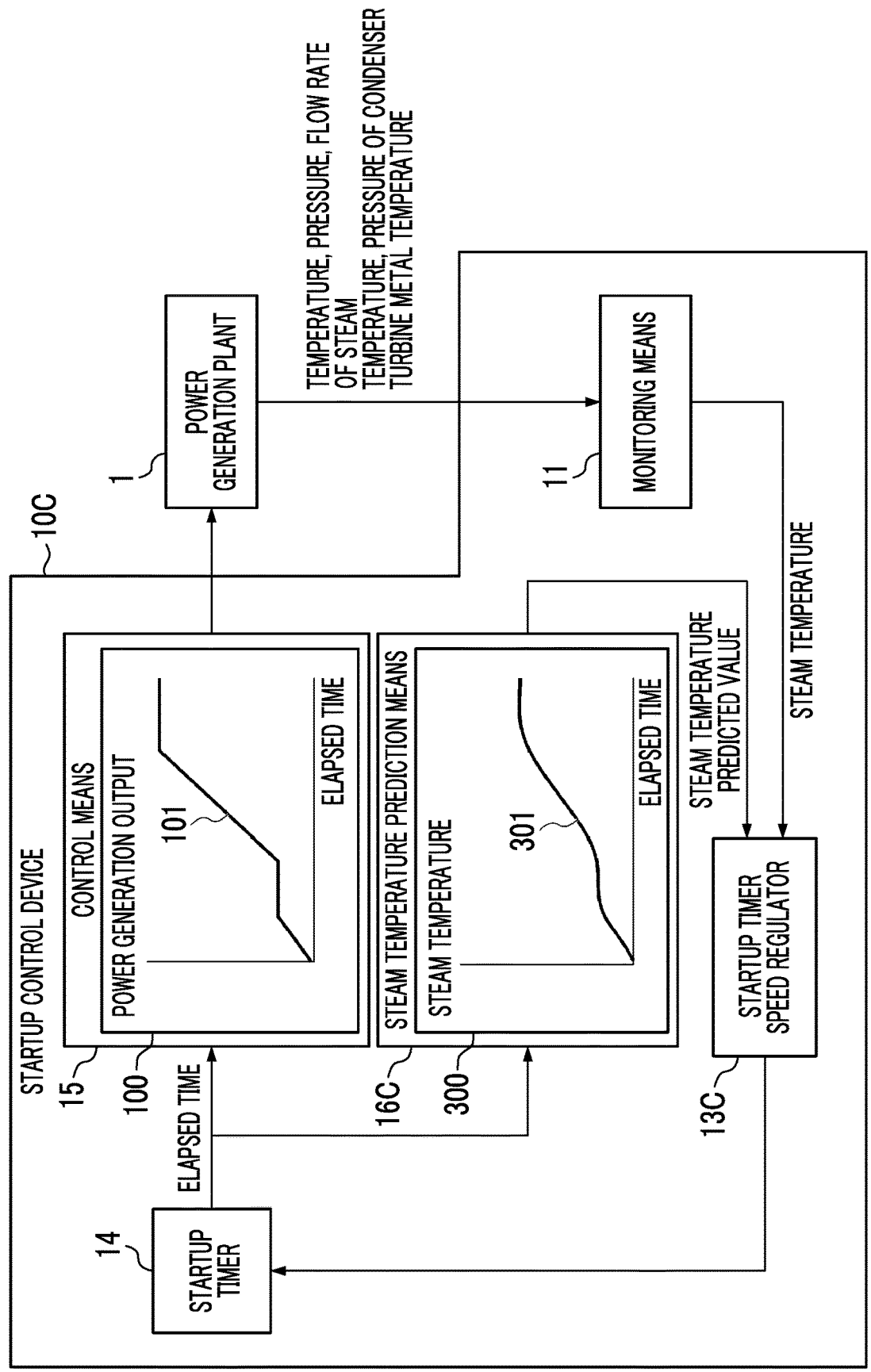
FIG. 7 is a diagram showing a configuration example of a startup control device for a power generation plant according to a fourth embodiment.

FIG. 7 is a diagram showing a configuration example of the startup control device for a power generation plant according to the fourth embodiment.

Among the components according to the fourth embodiment of the present disclosure, the same components as the functional units configuring the startup control device 10 according to the first embodiment of the present disclosure are designated by the same reference numerals, and the description thereof will be omitted.

A startup control device 10C according to the fourth embodiment includes monitoring means 11, a startup timer speed regulator 13C, a startup timer 14, control means 15, and steam temperature prediction means 16C.

The startup timer speed regulator 13C acquires the steam temperature predicted value and the measured value of the steam temperature instead of the stress predicted value and the stress estimated value, and compares them. When the measured value of the steam temperature exceeds the steam temperature predicted value, the startup timer speed regulator 13C outputs a speed command to reduce the progress speed of the startup timer 14.

The steam temperature prediction means 16C outputs a predicted value of the steam temperature at the inlet of the steam turbine 2 in the elapsed time measured by the startup timer 14. The steam temperature prediction means 16C has a graph 300 that defines a predicted value of the steam temperature. An optimal steam temperature predicted value curve 301 is created by simulating the temperature of the steam flowing into the steam turbine 2 when the power generation plant 1 performs the fastest startup shown in the optimal startup curve 101. The steam temperature prediction means 16C outputs the steam temperature indicated by the optimal steam temperature predicted value curve 301 in the elapsed time acquired from the startup timer 14 as the steam temperature predicted value.

(Operation)

Next, the operation of the startup control device 10C will be described with reference to FIG. 8.

Figure 8:
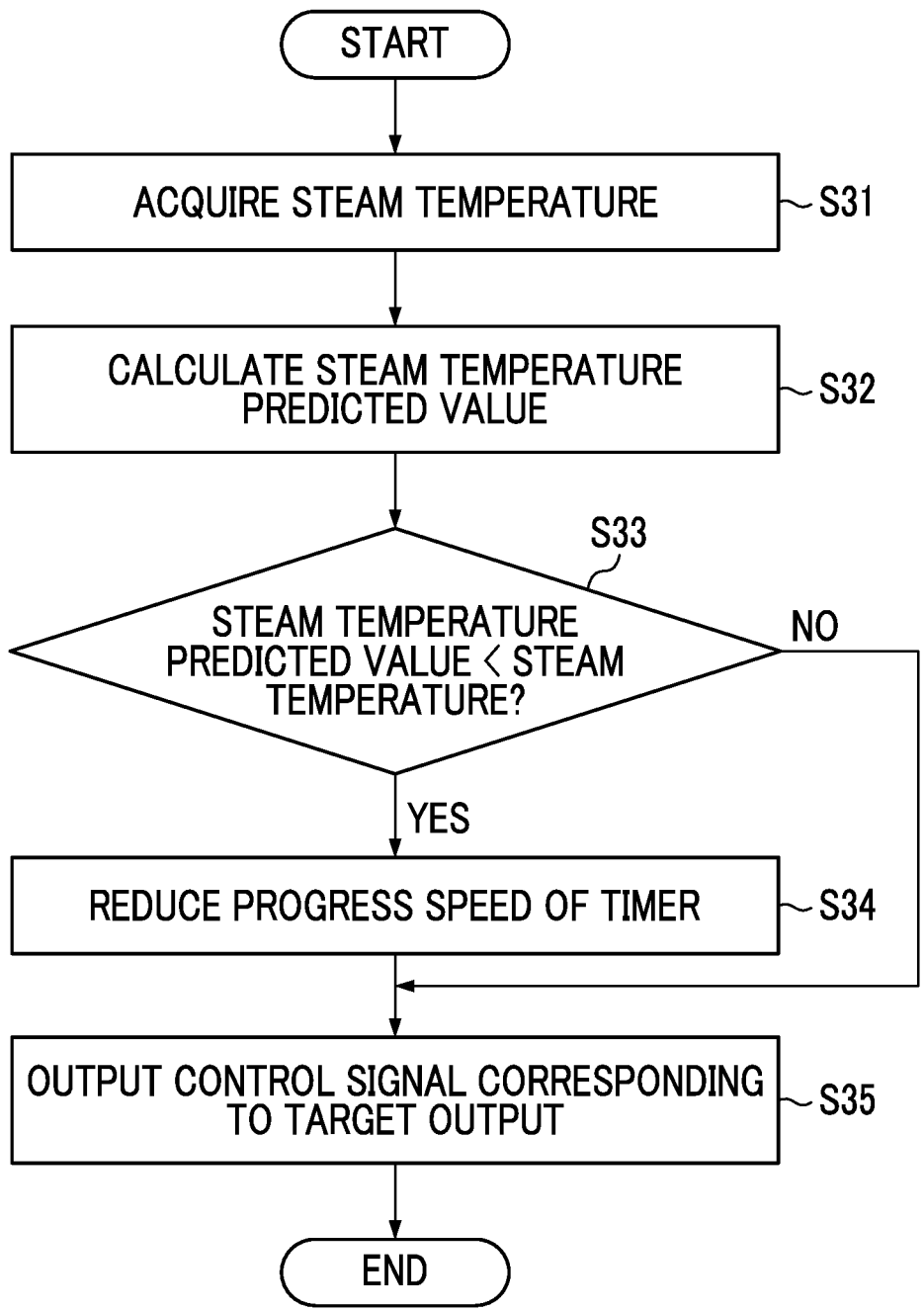
FIG. 8 is a diagram showing an example of processing of the startup control device according to the fourth embodiment.

FIG. 8 is a diagram showing an example of processing of the startup control device according to the fourth embodiment.

The monitoring means 11 acquires the temperature, pressure, and flow rate of the steam, the water temperature and pressure of the condenser 4, the turbine metal temperature, or the like at the inlet of the steam turbine 2 from the power generation plant 1. The monitoring means 11 outputs the measured value of the steam temperature to the startup timer speed regulator 13C (step S31).

On the other hand, the steam temperature prediction means 16C acquires the elapsed time measured by the startup timer 14, and calculates the steam temperature indicated by the optimal steam temperature predicted value curve 301 in the elapsed time. The steam temperature prediction means 16C outputs the steam temperature calculated based on the optimal steam temperature predicted value curve 301 to the startup timer speed regulator 13C as the steam temperature predicted value (step S32).

The processes of steps S31 and S32 are performed in parallel, and there is no preference in the order of processes.

Next, the startup timer speed regulator 13C compares the acquired steam temperature predicted value with the measured value of the steam temperature (step S33). The steam temperature at the inlet of the steam turbine 2 has a positive correlation with the thermal stress generated in the impeller, and as the steam temperature rises, the thermal stress also increases. Therefore, when the steam temperature predicted value is equal to or higher than the steam temperature (measured value) (step S33; No), the actual thermal stress is considered to be within the permissible range. Therefore, the startup timer speed regulator 13C instructs the startup timer 14 to advance the elapsed time at the same speed as the present. The startup timer 14 measures the elapsed time from the startup at the current speed, and outputs the elapsed time at that time to the control means 15 and the steam temperature prediction means 16C. The control means 15 determines a target output based on the optimal startup curve 101 and the elapsed time acquired from the startup timer 14, and outputs a control signal corresponding to the target output to the power generation plant 1 (step S35).

When the steam temperature estimated value exceeds the steam temperature (step S33; Yes), the actual thermal stress may exceed the thermal stress at the shortest startup, and may exceed the thermal stress constraint (limit line 203). The startup timer speed regulator 13C instructs the startup timer 14 to reduce the progress speed of the elapsed time. The startup timer 14 reduces the progress speed of the elapsed time on the startup schedule (step S34). The startup timer 14 outputs the elapsed time at that time to the control means 15 and the steam temperature prediction means 16C. The control means 15 determines a target output based on the optimal startup curve 101 and the elapsed time acquired from the startup timer 14, and outputs a control signal corresponding to the target output to the power generation plant 1 (step S35).

Similarly to the first embodiment, the startup control device 10C also performs the processes of steps S31 to S35 in the next control cycle. For example, when the speed of the startup timer 14 is reduced, the steam temperature predicted value according to the elapsed time measured by the startup timer 14 is compared with the latest measured value of the steam temperature, in step S33. When the measured value of the steam temperature becomes equal to or less than the steam temperature predicted value by reducing the progress speed of the startup timer 14 and lowering the target output, the progress speed of the startup timer 14 is maintained as it is. Alternatively, when the measured value of the steam temperature is much lower than the steam temperature predicted value, the startup timer speed regulator 13C may output a speed command for increasing the progress speed of the elapsed time to the startup timer 14. Even with the startup control based on the steam temperature, the same effect as that of the first embodiment can be obtained.

The startup control device 10C of the present embodiment includes (1) an optimal steam temperature predicted value curve 301 showing the transition of the predicted value of the steam temperature when the power generation plant is started with the optimal startup curve 101, and (2) a startup timer speed regulator 13C that inputs the actual steam temperature, compares the measured value with the predicted value, and, for example, if the measured value of steam temperature exceeds the predicted value of steam temperature, outputs a speed command to the startup timer 14 so as to reduce the progress speed of the startup timer 14. Thus, the power generation plant 1 can be started at high speed while satisfying the constraints of thermal stress. The stress calculation by the stress model 12 of the first embodiment to the third embodiment has a high calculation load. On the other hand, according to the fourth embodiment, it is not necessary to calculate the stress in real time, so that practicality is improved.

Fifth Embodiment

It is also possible to apply the startup control method by the startup control device 10C of the fourth embodiment to the power generation plant 1B including the plurality of steam turbines described in the third embodiment.

(Configuration)

Figure 9:
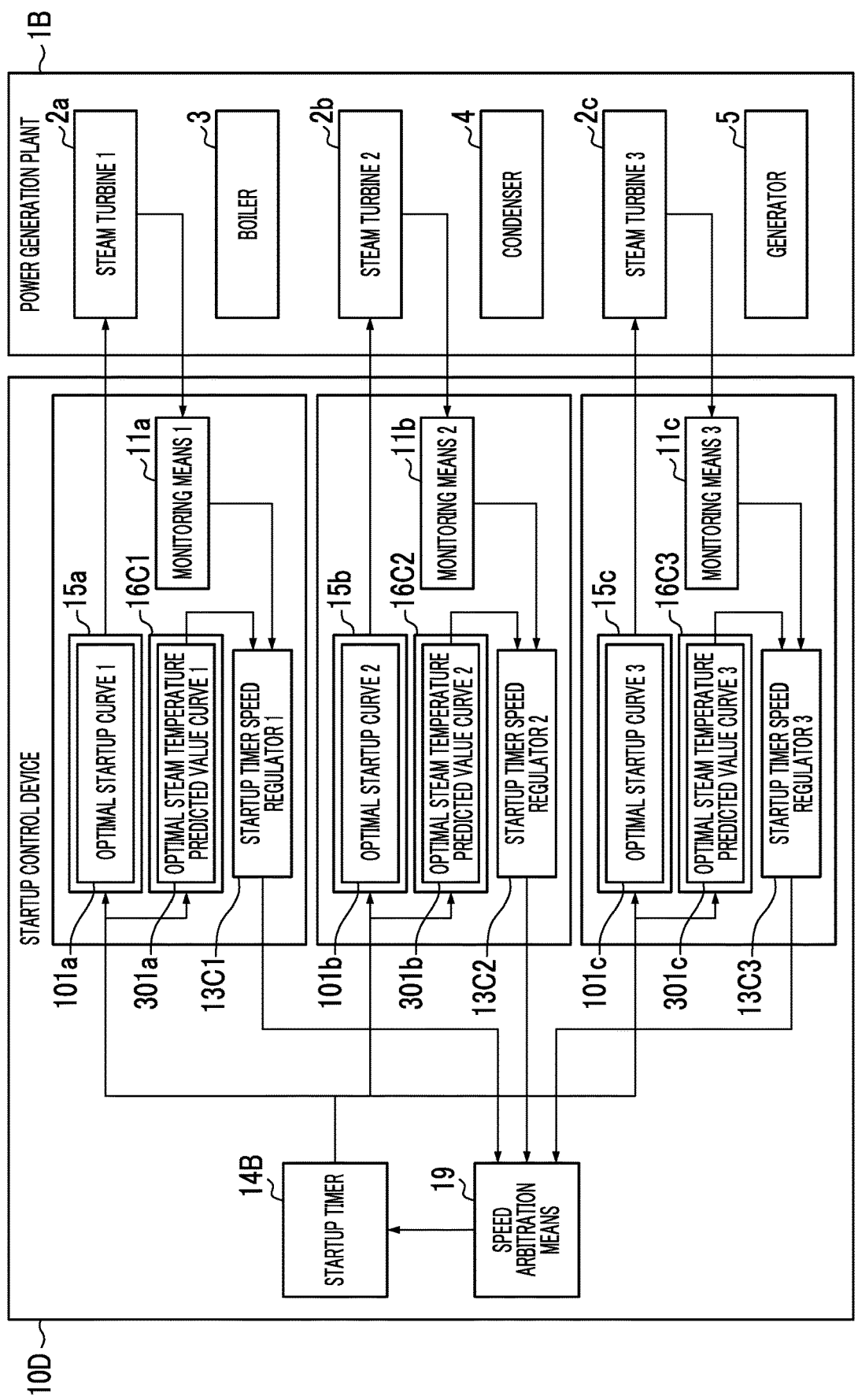
FIG. 9 is a diagram showing a configuration example of a startup control device for a power generation plant according to a fifth embodiment.
Figure 10:
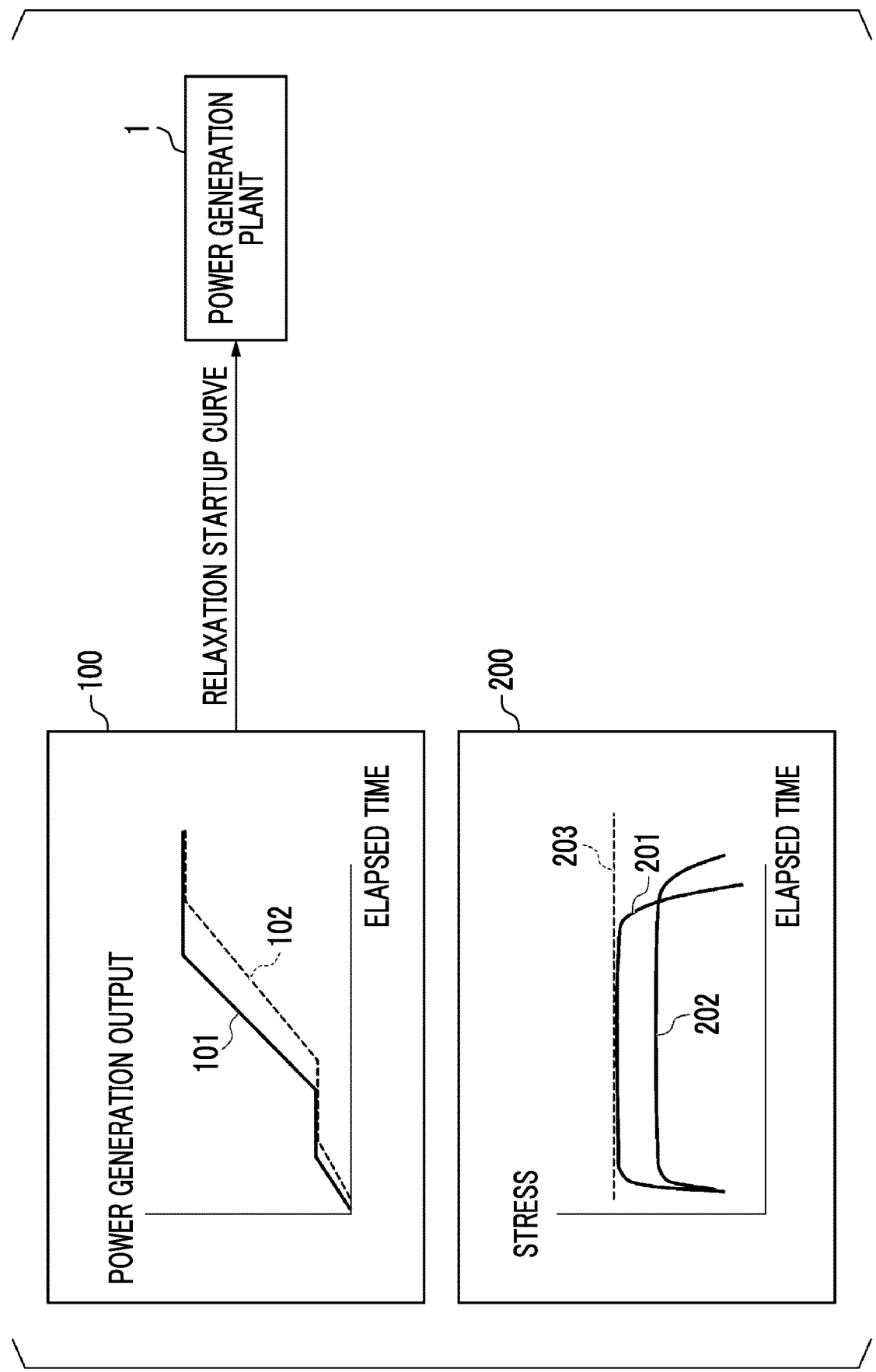
FIG. 10 is a diagram illustrating a general startup control method for a power generation plant.

Hereinafter, a startup control device 10D according to a fifth embodiment of the present disclosure will be described with reference to FIG. 9. FIG. 9 is a diagram showing a configuration example of the startup control device for a power generation plant according to the fifth embodiment.

The startup control device 10D includes monitoring means 11a to 11c, startup timer speed regulators 13C1 to 13C3, a startup timer 14B, control means 15a to 15c, steam temperature prediction means 16C1 to 16C3, and speed arbitration means 19.

The steam temperature prediction means 16C1 has an optimal steam temperature predicted value curve 301a showing a predicted value of the steam temperature at the inlet of the steam turbine 2a when the steam turbine 2a is started based on the optimal startup curve 101a. The same applies to the steam temperature prediction means 16C2 and 16C3. The startup timer speed regulators 13C1 to 13C3 have the same functions as the startup timer speed regulator 13C of the fourth embodiment.

(Operation)

The startup control device 10D performs the processes of steps S31 to S33 of FIG. 8 for each of the steam turbines 2a to 2c to calculate the speed command. Next, the speed arbitration means 19 selects the slowest speed command among the speed commands respectively acquired from the startup timer speed regulators 13C1 to 13C3, and outputs the selected value to the startup timer 14B. The startup timer 14B advances the elapsed time at a speed based on the speed command issued by the speed arbitration means 19. The startup timer 14B outputs the measured elapsed time to the control means 15a to 15c and the steam temperature prediction means 16C1 to 16C3.

Thus, the steam turbines 2a to 2c can be started in the shortest time while satisfying the constraints of the temperature of the steam flowing into each of the plurality of steam turbines 2a to 2c.

Figure 11:
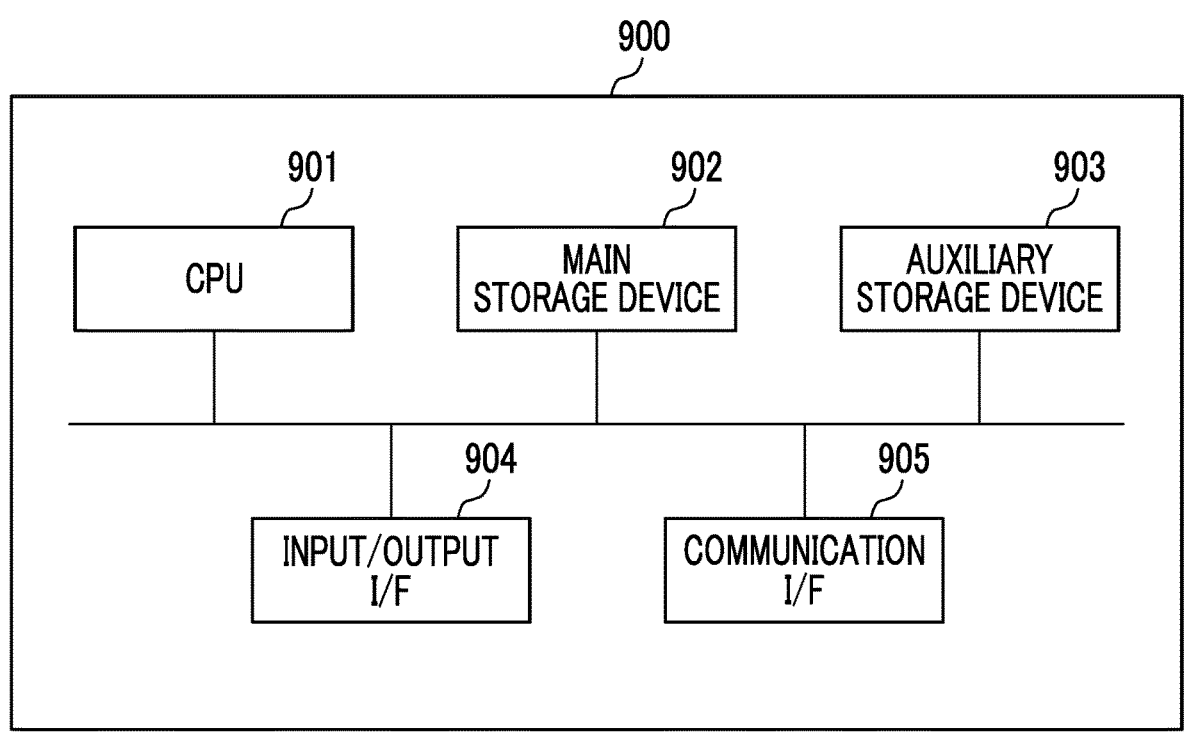
FIG. 11 is a diagram showing an example of a hardware configuration of the startup control device according to each embodiment.

FIG. 11 is a diagram showing an example of the hardware configuration of the startup control device according to the embodiment.

A computer 900 includes a CPU 901, a main storage device 902, an auxiliary storage device 903, an input/output interface 904, and a communication interface 905.

The above-described startup control devices 10, 10A, 10B, 10C, and 10D are mounted on the computer 900. Each of the above-described functions is stored in the auxiliary storage device 903 in the form of a program. The CPU 901 reads the program from the auxiliary storage device 903, extracts the program into the main storage device 902, and executes the above process according to the program. The CPU 901 secures a storage area in the main storage device 902 according to the program. The CPU 901 secures a storage area for storing the data being processed in the auxiliary storage device 903 according to the program.

A program for achieving all or a part of the functions of the startup control devices 10, 10A, 10B, 10C, and 10D is recorded on a computer-readable recording medium, and the process by each functional unit may be performed by a computer system reading and executing the program recorded on the recording medium. The term "computer system" as used herein includes an OS and hardware such as peripheral devices. The "computer system" includes a homepage providing environment (or a display environment) when a WWW system is used. The "computer-readable recording medium" refers to a portable medium such as a CD, DVD, or USB, or a storage device such as a hard disk built in a computer system. When this program is delivered to the computer 900 through a communication line, the computer 900 receiving the delivered program may extract the program in the main storage device 902 and execute the above process. The above-described program may achieve a part of the above-described functions, or may further achieve the above-described functions in combination with the program already recorded in the computer system.

The startup control devices 10 to 10D may be composed of a plurality of computers 900 capable of communicating with each other. For example, the stress model 12 may be mounted on another computer 900 in the startup control devices 10 and 10A. For example, in the startup control devices 10B and 10D, the control functions of the steam turbines 2a to 2c (for example, in the case of the steam turbine 2a of the startup control device 10B, the monitoring means 11a, the startup timer speed regulator 13a, the control means 15a, and the stress prediction means 16a) may be mounted on different computers 900, and the stress models 12a to 12c may be mounted on different computers 900.

As described above, some embodiments according to the present disclosure have been described, but all of these embodiments are presented as examples and are not intended to limit the scope of invention. These embodiments can be implemented in various other embodiments, and various omissions, replacements, and changes can be made without departing from the gist of the invention. These embodiments and variations thereof are included in the scope of the invention described in the claims as well as in the equivalent scope and abstract of the invention.

<Additional Notes>

The startup control devices 10 to 10D, the startup control method, and the program described in each embodiment are understood as follows, for example.

(1) The startup control devices 10 to 10D according to a first aspect include a determination unit (startup timer speed regulators 13 and 13C) which, for a predetermined physical quantity (thermal stress of an impeller, a temperature of steam flowing into the steam turbine 2) that constrains startup of the power generation plant 1, determines, based on a predicted value (a stress predicted value output by stress prediction means 16 and a steam temperature predicted value output by steam temperature prediction means 16C) of the physical quantity according to an elapsed time from the startup when the power generation plant 1 is started based on a predetermined optimal startup schedule (optimal startup curve 101), and an observed value (stress estimated value output by the stress model 12, steam temperature output by the monitoring means 11) of the physical quantity acquired during the startup of the power generation plant, whether or not the observed value exceeds the predicted value; a speed adjustment unit (startup timer speed regulators 13 and 13C) that, when the determination unit determines that the observed value exceeds the predicted value, issues an instruction to decrease a progress speed of the elapsed time from the startup in the optimal startup schedule; and a startup timer 14 and 14B that advances the elapsed time from the startup at a speed based on the instruction.

As a result, the optimal startup curve 101 of the power generation plant 1 can be adjusted at the time of actual startup (during startup). This makes it possible to arbitrate the error between the prediction of the numerical model used when determining the optimal startup curve 101 and the response of the actual plant. Since the adjustment is performed based on the optimal startup schedule, the power generation plant 1 can be started at high speed. Since the startup schedule can be adjusted during the startup of the power generation plant 1, it is not necessary to start the power generation plant 1 based on a startup schedule that draws a gentle output rising curve that ensures safety. The observed value includes the measured value acquired by the monitoring means 11 and the estimated value estimated by the stress model 12.

(2) The startup control devices 10 to 10B according to a second aspect are the startup control devices 10 to 10B of (1), further including: an estimation model (stress model 12) that estimates the observed value of the physical quantity (thermal stress), based on operation data measured during the startup of the power generation plant 1, in which the determination unit determines whether or not the observed value exceeds the predicted value, based on the observed value estimated by the estimation model and the predicted value.

Thus, it is possible to estimate a physical quantity (thermal stress) that cannot be measured, from a predetermined physical quantity that constrains the startup of the power generation plant 1. The startup schedule can be adjusted according to the actual state of the power generation plant 1 being started in order to determine whether or not the constraint is satisfied by using the physical quantity estimated based on the measured value.

(3) The startup control devices 10 to 10B according to a third aspect are the startup control devices 10 to 10B of (2), in which the estimation model outputs the observed value of thermal stress generated in an impeller of a steam turbine, based on input parameters including measured values of a temperature, a pressure, and a flow rate of steam at an inlet of the steam turbine 2, and the determination unit determines whether or not the observed value of the thermal stress exceeds the predicted value of the thermal stress.

This makes it possible to adjust the startup schedule according to the actual state of the thermal stress of the impeller of the steam turbine 2.

(4) The startup control device 10A according to a fourth aspect is the startup control device 10A of (3), further including: an initial temperature calculation model 18 that calculates an initial temperature of the impeller of the steam turbine at the time of the startup of the power generation plant, based on the input parameters including the measured values of the temperature, the pressure, and the flow rate of the steam at the inlet of the steam turbine 2.

Thus, the accuracy of estimating the thermal stress of the impeller of the steam turbine 2 can be improved. Therefore, it is possible to reduce the risk that the thermal stress of the impeller exceeds the range of the constraint during the startup of the power generation plant 1.

(5) The startup control devices 10C and 10D according to a fifth aspect are the startup control devices 10C and 10D of (1), in which the determination unit (startup timer speed regulator 13C) determines, based on a predicted value of a steam temperature of a steam turbine according to the elapsed time from the startup based on the optimal startup schedule, and a measured value of the steam temperature of the steam turbine measured during the startup of the power generation plant, whether or not the measured value of the steam temperature exceeds the predicted value of the steam temperature, and when the determination unit determines that the measured value of the steam temperature exceeds the predicted value of the steam temperature, the speed adjustment unit (startup timer speed regulator 13C) issues an instruction to decrease the progress speed of the elapsed time.

Since it is not necessary to calculate the thermal stress, the calculation load of the startup control device 10C during startup can be reduced and the processing speed can be increased. In addition, cost reduction effects such as reducing the number of computers to be introduced can be obtained.

(6) The startup control devices 10B and 10D according to a sixth aspect are the startup control devices 10B and 10D of (1) to (5), in which the determination unit determines whether or not the observed value of the physical quantity exceeds the predicted value of the physical quantity for each of a plurality of plant devices (steam turbines 2a to 2c) included in the power generation plant, the startup control device further including: a speed arbitration unit (speed arbitration means 19) that selects a speed command corresponding to largest decrease in progress speed, among speed commands respectively issued for the plant devices by the speed adjustment unit, based on the determination of the determination unit, and outputs the selected speed command to the startup timer.

This makes it possible to adjust the startup schedule during the startup of the power generation plant 1, even when the power generation plant 1 includes a plurality of plant devices that need to be started over the same amount of time. Since the adjustment is performed based on the optimal startup schedule, the power generation plant 1 can be started at high speed.

(7) The startup control method according to a seventh aspect includes: determining, for a predetermined physical quantity that constrains startup of a power generation plant, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value; issuing, when it is determined that the observed value exceeds the predicted value in the determining, an instruction to decrease a progress speed of the elapsed time from the startup in the optimal startup schedule; and advancing the elapsed time from the startup at a speed based on the instruction.

(8) A program according to an eighth aspect causes a computer to function as: means for determining, for a predetermined physical quantity that constrains startup of a power generation plant, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value; means for issuing, when it is determined that the observed value exceeds the predicted value in the determining, an instruction to decrease a progress speed of the elapsed time from the startup in the optimal startup schedule; and means for advancing the elapsed time from the startup at a speed based on the instruction.

INDUSTRIAL APPLICABILITY

According to the above-described startup control device, startup control method, and program, the startup schedule of a power generation plant can be adjusted during startup.

REFERENCE SIGNS LIST 1, 1B Power generation plant
2, 2a, 2b, 2c Steam turbine
3 Boiler
4 Condenser
5 Generator
10, 10A to 10D Startup control device
11, 11a to 11c Monitoring means
12, 12a to 12c Stress model
13, 13a to 13c, 13C, 13C1 to 13C3 Startup timer speed regulator
14, 14B Startup timer
15, 15a to 15c Control means
16, 16a to 16c Stress prediction means
16C, 16C1 to 16C3 Steam temperature prediction means
17 Recording means
18 Initial temperature calculation model
19 Speed arbitration means
100, 200 Graph
101, 101a to 101c Optimal startup curve
102 Relaxation startup curve
201 Optimal stress predicted value curve
202 Stress predicted value curve
203 Limit line
900 Computer
901 CPU
902 Main storage device
903 Auxiliary storage device
904 Input/output interface
905 Communication interface

The invention claimed is:

1. A startup control device comprising:
a determination unit that, for a predetermined physical quantity that constrains startup of a power generation plant, determines, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value;
a speed adjustment unit that, when the determination unit determines that the observed value exceeds the predicted value, issues an instruction to decrease a progress speed of the elapsed time from the startup in the optimal startup schedule;
a startup timer that advances the elapsed time from the startup at a speed based on the instruction; and
a control unit that outputs, to the power generation plant, a control signal corresponding to a target output according to the predetermined optimal startup schedule at a time corresponding to the elapsed time indicated by the startup timer.

2. The startup control device according to claim 1, further comprising:
an estimation model that estimates the observed value of the physical quantity, based on operation data measured during the startup of the power generation plant, wherein
the determination unit determines whether or not the observed value exceeds the predicted value, based on the observed value estimated by the estimation model and the predicted value.

3. The startup control device according to claim 2, wherein
the estimation model outputs an observed value of thermal stress generated in an impeller of a steam turbine, based on input parameters including measured values of a temperature, a pressure, and a flow rate of steam at an inlet of the steam turbine, and the determination unit determines whether or not the observed value of the thermal stress exceeds a predicted value of the thermal stress.

4. The startup control device according to claim 3, further comprising:

an initial temperature calculation model that calculates an initial temperature of the impeller of the steam turbine at the time of the startup of the power generation plant, based on the input parameters including the measured values of the temperature, the pressure, and the flow rate of the steam at the inlet of the steam turbine.

5. The startup control device according to claim 1, wherein the determination unit determines, based on a predicted value of a steam temperature of a steam turbine according to the elapsed time from the startup based on the optimal startup schedule, and a measured value of the steam temperature of the steam turbine measured during the startup of the power generation plant, whether or not the measured value of the steam temperature exceeds the predicted value of the steam temperature, and when the determination unit determines that the measured value of the steam temperature exceeds the predicted value of the steam temperature, the speed adjustment unit issues an instruction to decrease the progress speed of the elapsed time.

6. The startup control device according to claim 1, wherein the determination unit determines whether or not the observed value of the physical quantity exceeds the predicted value of the physical quantity for each of a plurality of plant devices included in the power generation plant, the startup control device further comprising:

a speed arbitration unit that selects a speed command corresponding to a largest decrease in progress speed, among speed commands respectively issued for the plant devices by the speed adjustment unit, based on the determination of the determination unit, and outputs the selected speed command to the startup timer.

7. A startup control method comprising:

determining, for a predetermined physical quantity that constrains startup of a power generation plant, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value;

issuing, when it is determined that the observed value exceeds the predicted value in the determining, an instruction, to a startup timer that advances the elapsed time from the startup, to decrease a progress speed of the elapsed time from the startup in the optimal startup schedule; and outputting, to the power generation plant, a control signal corresponding to a target output according to the predetermined optimal startup schedule at a time corresponding to the elapsed time indicated by the startup timer which has advanced the elapsed time at a speed based on the instruction.

8. A non-transitory computer-readable medium having stored thereon a computer program causing a computer to function as:

means for determining, for a predetermined physical quantity that constrains startup of a power generation plant, based on a predicted value of the physical quantity according to an elapsed time from the startup when the power generation plant is started based on a predetermined optimal startup schedule, and an observed value of the physical quantity acquired during the startup of the power generation plant, whether or not the observed value exceeds the predicted value;

means for issuing, when it is determined that the observed value exceeds the predicted value in the determining, an instruction, to a startup timer that advances the elapsed time from the startup, to decrease a progress speed of the elapsed time from the startup in the optimal startup schedule; and means for outputting, to the power generation plant, a control signal corresponding to a target output according to the predetermined optimal startup schedule at a time corresponding to the elapsed time indicated by the startup timer which has advanced the elapsed time at a speed based on the instruction.

* * * * *